United States Patent
El-Ibiary

Patent Number: 5,433,525
Date of Patent: Jul. 18, 1995

[54] BEARING HOUSING WITH EMBEDDED TEMPERATURE MEASUREMENT DEVICE

[75] Inventor: Yehia El-Ibiary, Greenville, S.C.

[73] Assignee: Reliance Electric Industrial Company, Greenville, S.C.

[21] Appl. No.: 106,061

[22] Filed: Aug. 13, 1993

[51] Int. Cl.[6] .......... G01K 1/14; G01K 13/08
[52] U.S. Cl. .................. 374/141; 374/153; 384/448
[58] Field of Search .......... 374/141, 153, 179; 384/448, 624

[56] References Cited

U.S. PATENT DOCUMENTS

| | | | |
|---|---|---|---|
| 2,625,573 | 1/1953 | Connell | 374/179 |
| 3,052,123 | 9/1962 | Gustafson | 374/153 |
| 3,824,579 | 7/1974 | Waseleski, Jr. et al. | 384/624 |
| 3,897,272 | 7/1975 | Medlar | 374/141 |
| 4,074,575 | 2/1978 | Bergman et al. | 374/142 |
| 4,164,433 | 8/1979 | Granahan et al. | 374/179 |
| 4,340,886 | 7/1982 | Boldt et al. | 374/153 |
| 4,483,631 | 11/1984 | Kydd | 374/179 |
| 4,721,399 | 1/1988 | Grosskurth et al. | 384/448 |

FOREIGN PATENT DOCUMENTS

| | | | |
|---|---|---|---|
| 0850969 | 9/1970 | Canada | 384/624 |
| 2402198 | 4/1979 | France | 384/624 |
| 0217599 | 1/1985 | Germany | 384/448 |
| 0038826 | 2/1990 | Japan | 374/141 |
| 402085521 | 3/1990 | Japan | 384/448 |
| 1772441 | 10/1992 | U.S.S.R. | 384/448 |

*Primary Examiner*—Diego F. F. Gutierrez
*Attorney, Agent, or Firm*—Dority & Manning

[57] ABSTRACT

A bearing assembly with a temperature measuring device embedded in the housing and arranged so as to be responsive to the temperature within the housing. The bearing assembly includes a transmitter for transmitting the signal received from the measuring or sensing junction of the temperature measuring device to an instrument for determining the temperature sensed by the device.

21 Claims, 3 Drawing Sheets

BEARING HOUSING WITH EMBEDDED TEMPERATURE MEASUREMENT DEVICE

BACKGROUND OF THE INVENTION

The present invention relates generally to bearing housings and, more particularly, to a novel bearing housing with an embedded temperature measuring device for monitoring the temperature of a bearing or bearing assembly.

Costly failures can occur when bearings in a bearing housing are operated above certain temperatures. Excessive temperatures in a bearing can result, for example, from inadequate bearing lubricant, misaligned bearings, or other abnormalities in the proper operation of the bearing assembly.

Certain types of stand alone thermocouples have been used to monitor bearing temperature in the past. A thermocouple generally comprises a pair of wires of dissimilar metals that are joined on one end and the free ends of the wires are connected to an instrument that measures the difference in potential created at the junction of the two metals. In prior applications, the typically spring loaded thermocouples were installed by drilling and threading a hole in the bearing housing. The thermocouple utilized included a rigid sheath that protects the thermocouple wires and a signal transmitter for connecting to the instrument, such as a voltmeter, that measures the difference in potential at the junction of the two metals. The cost of drilling and tapping a hole, along with the cost of the sheath that protects the thermocouple wires, the spring, and the connecting head that houses the signal transmitter together comprise a very expensive package. Thus, many users forego the use of the thermocouple and have no means for measuring the temperature in the bearing housing during operation.

SUMMARY OF THE INVENTION

The present invention recognizes and addresses the foregoing disadvantages, and others of prior art bearing assemblies.

Accordingly, it is an object of the present invention to provide an improved bearing housing with a temperature measuring device for monitoring temperature.

It is another object of the present invention to provide a low cost system for monitoring the temperature of bearings in a bearing housing.

It is another object of the present invention to provide an improved system for preventing bearing failure.

It is another object of the present invention to provide an improved bearing housing that includes an embedded thermocouple.

Another object of the present invention is to provide a compact apparatus for sensing the temperature in a bearing housing.

A further object of the present invention is to provide an improved bearing assembly.

Still a further object of the present invention is to provide an improved method of sensing bearing temperature in a bearing assembly.

These and other objects are achieved by providing an improved bearing assembly comprising a bearing housing containing at least one bearing therein adapted to rotatably support a shaft in the housing. The improved bearing assembly further includes a thermocouple, the thermocouple including dissimilar wires connected at a measuring junction and adapted to be placed at the location where sensing is desired. The measuring junction of the thermocouple is embedded in the bearing housing and arranged so as to be responsive to the temperature within the housing. The improved bearing assembly further includes a signal transmitter located proximate the housing for transmitting the signals received from the measuring junction to an instrument for determining the temperature sensed by the thermocouple at the measuring junction.

These and other objects are also achieved by providing an improved method of sensing bearing temperature in a bearing assembly, the method including the steps of providing a bearing housing containing at least one bearing therein adapted to rotatably support a shaft in the housing. The method further includes the step of providing a thermocouple including dissimilar wires connected at a measuring junction and adapted to be placed at the location where sensing is desired. The improved method further includes the step of embedding the measuring junction portion of the thermocouple in the bearing housing in a manner so as to be responsive to the temperature within the housing, and providing a signal transmitter located proximate the housing for transmitting the signal received from the measuring junction to an instrument for determining the temperature sensed by the thermocouple at the measuring junction.

These and other objects are also achieved by providing an improved bearing assembly comprising a bearing housing containing at least one bearing therein adapted to rotatably support a shaft in the housing. The improved bearing assembly includes a temperature measurement device, the temperature measurement device including a sensing portion adapted to be placed at the location where sensing is desired, and the sensing portion being embedded in the bearing housing and arranged so as to be responsive to the temperature within the housing.

Still further, these and other objects are achieved by providing an improved method including the steps of providing a bearing housing containing at least one bearing therein adapted to rotatably support sa shaft in the housing. The method further includes the step of providing a temperature measurement device with a sensing portion adapted to be placed at the location where sensing is desired and embedding the sensing portion in the bearing housing so as to be responsive to the temperature within the housing.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying Figures, in which.

Figure 1:
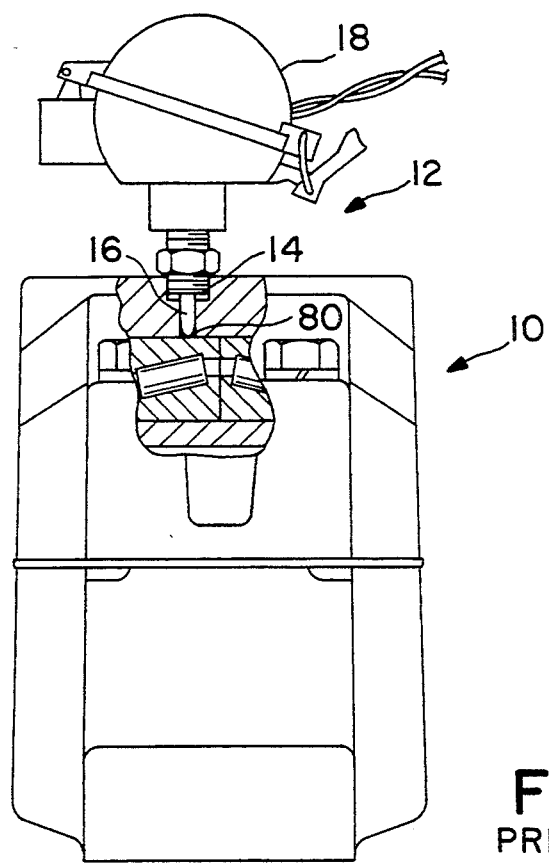
FIG. 1 is a side view with a partial cross-sectional area illustrating a prior art device.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

FIG. 1 illustrates a prior art bearing assembly 10 with an example of a conventional thermocouple assembly 12 installed therein. In such prior art thermocouple arrangements, the typically spring-loaded (spring not shown) thermocouples 12 are installed by drilling and threading a hole 14 in the bearing housing 10. The thermocouple includes a rigid sheath 16 that protects the thermocouple wires and a connecting head 18 containing a signal transmitter for connecting to the instrument, such as a voltmeter, that measures the difference in potential at the junction of the two metal wires contained in the thermocouple. Connecting head 18 houses the signal transmitter and is mounted above the sheath portion of the thermocouple. In operation, a hole 14 is drilled and tapped in the bearing housing and the thermocouple apparatus is threadedly mounted in the bearing housing with the transmitter supported via the connecting head above the bearing housing.

Figure 2:
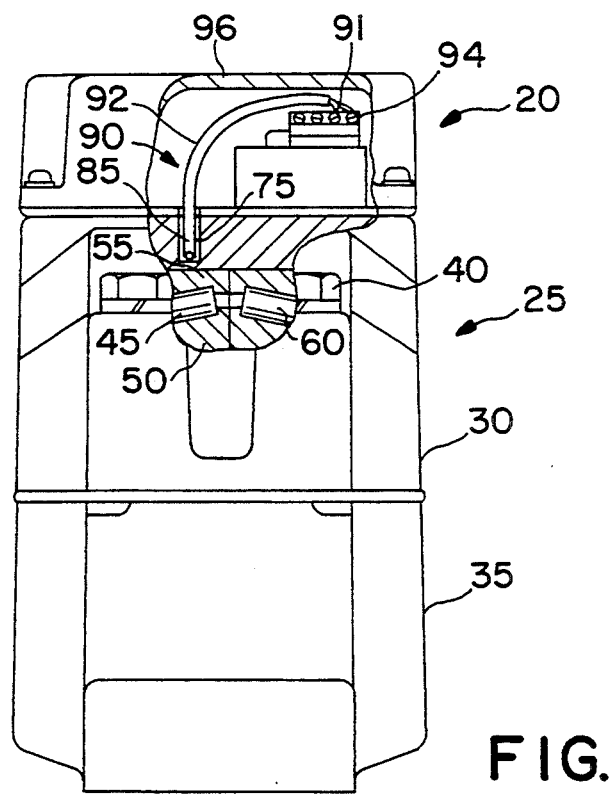
FIG. 2 is a side view of a bearing assembly in accordance with an embodiment of the present invention with a portion illustrated in cross-section.
Figure 3:
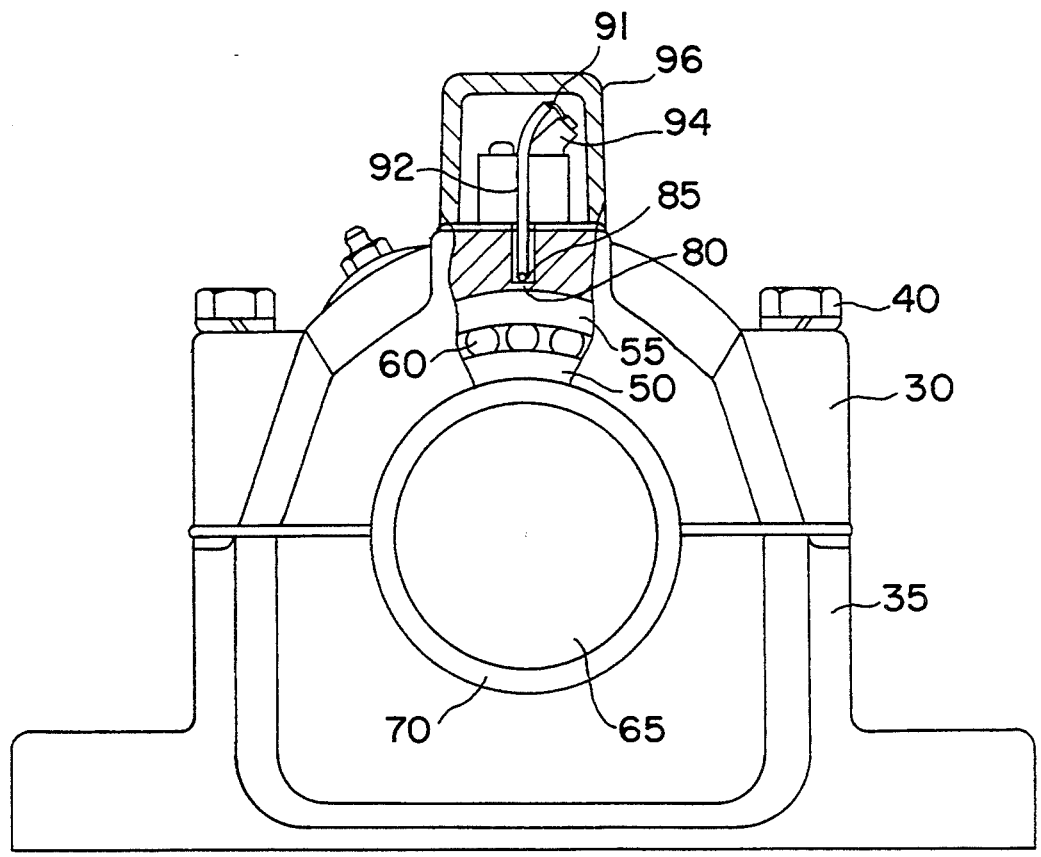
FIG. 3 is an end view of the bearing assembly illustrated in FIG. 2 with a portion illustrated in cross-section.

Referring to FIGS. 2 and 3, an improved bearing assembly in accordance with an embodiment of the present invention is illustrated at 20. Bearing assembly 20 includes a housing 25 with an upper section 30 and a lower section 35. Upper section 30 and lower section 35 may be secured together by screws 40 or any other suitable securing means. It should be appreciated that the particular type bearing housing or assembly utilized may vary depending on the application desired and is not critical to the present invention. One example of a suitable bearing assembly would be the UNIFIED SAF pillow block design sold by Reliance Electric Industrial Company, the assignee of the present invention.

Housing 25 contains at least one bearing 45 which may be of any conventional nature. As illustrated in FIGS. 2 and 3, bearing 45 includes an inner race 50 and an outer race 55 maintaining therebetween rollers 60. Bearing 45 is adapted to support a shaft, such as 65, therein for rotation with respect to said housing. Housing 25 further defines a shaft bore 70 for receipt of the shaft 65.

In accordance with the present invention, and referring particularly to FIGS. 2 and 3, upper section 30 of housing 25 includes an unthreaded bore 75 therein. Bore 75 extends from an exterior surface of the housing toward shaft bore 70 and terminates prior to entry into the shaft bore. In other words, a portion of material illustrated at 80 remains between unthreaded bore 75 and shaft bore 70 or outer race 55. The thickness of portion 80 is determined so that the temperature at the measuring junction or sensing portion 85 of the thermocouple or other temperature measurement device will be accurately representative of the bearing temperature as will be set forth in more detail below.

Portion 80 is provided to protect the temperature measurement device from grease and other contaminants from within the shaft bore. While the thickness of portion 80 may vary depending on the housing material and size of the bearing and like considerations, in one embodiment, a thickness of approximately e,fra 1/16e inch has been determined to be appropriate for at least some bearing assemblies.

Figure 5:
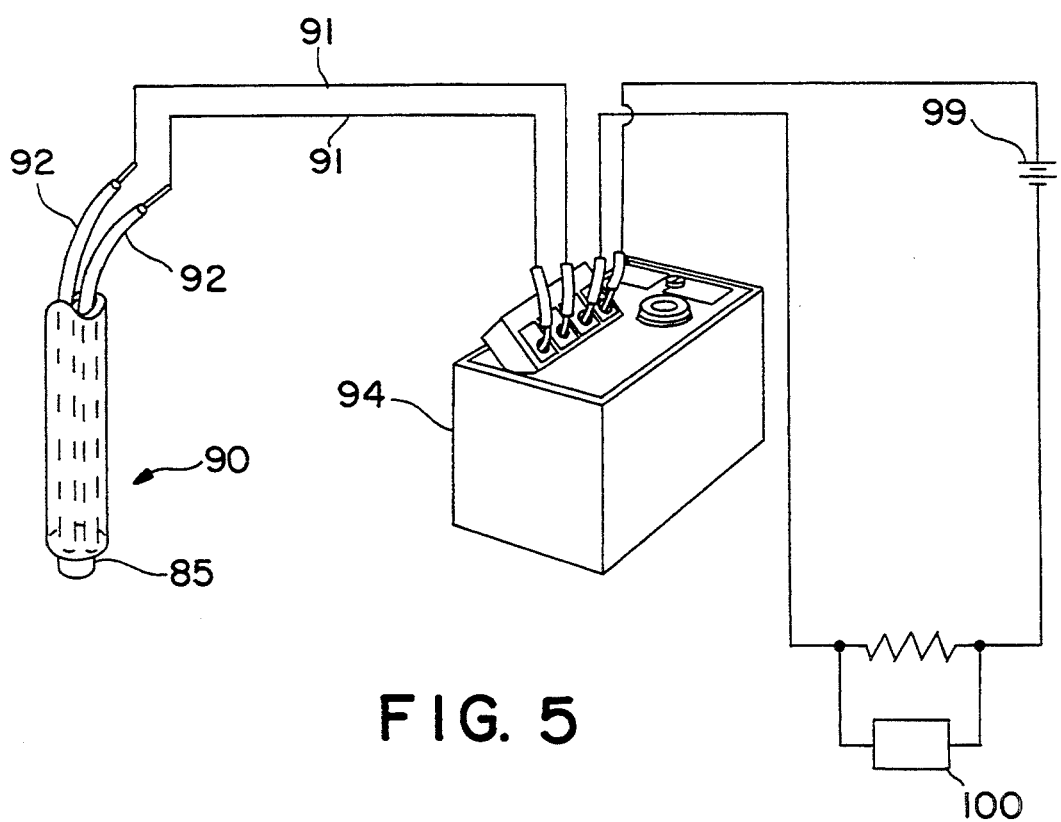
FIG. 5 is a schematic view illustrating one manner in which the thermocouple embodiment of the present invention could be utilized.

Referring to FIGS. 2, 3 and 5, received within unthreaded bore 75 is a temperature measuring device 90. In a preferred embodiment, the temperature measuring device is a thermocouple. Thermocouple 90 includes a plurality of wires 91 of dissimilar material joined at a measuring junction 85. The measuring junction 85 is adapted to be placed at the location where temperature sensing is desired. The thermocouple wires are protected by insulation material over their length such as illustrated at 92 to prevent shorting. Wires 91 extend from measuring junction 85 into a signal transmitter 94. Signal transmitter 94 is located proximate housing 25 and, in a preferred embodiment, secured to said housing. Signal transmitter 94 is contained in a cover portion 96 and is adapted to transmit the signals received from the measuring junction to an instrument for determining the temperature sensed by the thermocouple at the measuring junction.

As can best be seen from FIG. 5, signal transmitter 94 is connected on its one side to the wires of a temperature measuring device. It is also connected to a source of power such as a battery 99 so that the signal received from the measuring device is output to a measuring instrument as illustrated at 100. For convenience, a thermocouple will be referred to in this specification, but it should be appreciated that a resistance temperature detector or other known device capable of sensing the temperature in the bearing assembly is within the scope of the present invention. In this regard, it should also be appreciated by those skilled in the art that resistance temperature detectors are well known in the art and detailed description of their operation is not necessary for a proper understanding of the present invention.

In the embodiments utilizing a resistance temperature detector or the like, the portion adapted to be placed at the location to be sensed is referred to as the sensing portion. It is analogous to the measuring junction of the thermocouple.

Figure 4:
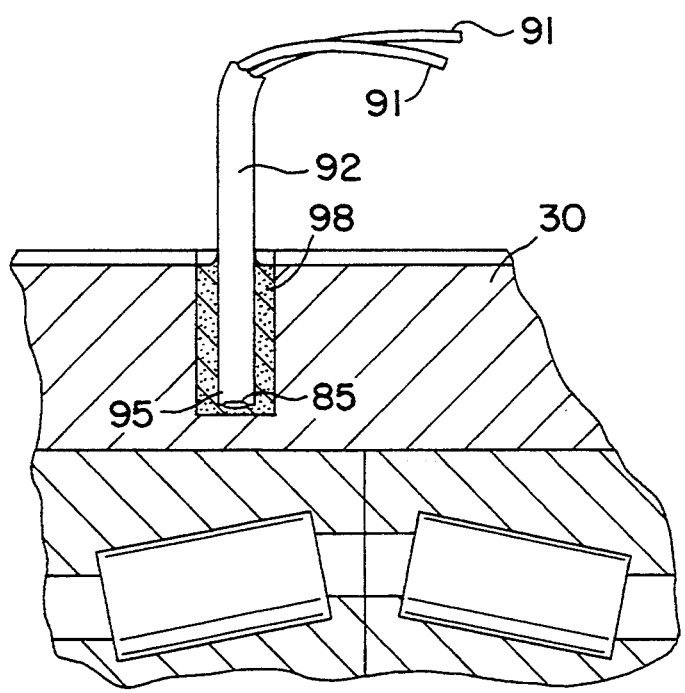
FIG. 4 is a detailed cross-sectional view of the cross-sectioned area of FIG. 3.

In a preferred embodiment, measuring junction or sensing portion 85 may be secured in unthreaded bore 75 with an adhesive 98 which substantially fills the bore 75 as best illustrated in FIG. 4. Adhesive 98 may be any type of known adhesive material such as, for example, an epoxy. It should be appreciated that any other known type of securing material could be utilized for securing the embedded measuring junction into the housing.

It should be appreciated that any suitable type of thermocouple or other measuring device could be utilized in the present invention depending on the desired characteristics of operation. In addition, the style of bearing housing, the materials utilized therein, the type of bearings and the material used to secure the measuring junction in the housing may all vary within the scope of the present invention.

In operation, measuring junction or sensing portion 85 is embedded directly in housing 25 thereby eliminating the necessity of a number of components and processing steps from the prior art devices. Specifically, the cost of drilling and tapping a suitable hole in the bore, along with the cost of the sheath that protects the thermocouple wires, the spring and the connecting head that houses the signal transmitter are all eliminated by the present invention. Therefore, as can be seen, the present invention is also embodied in an improved method of sensing bearing temperature in the bearing assembly which includes the steps of providing a bearing housing such as 25 containing at least one bearing such as 45 therein and adapted to rotatably support a shaft such as 65 in the housing. The method further includes the steps of providing a thermocouple or other temperature measurement device including dissimilar wires such as 91 connected to a measuring junction 85 or a resistance temperature detector with a sensing portion 85 and adapted to be placed at the location where sensing is desired such as within unthreaded bore 75. The method further includes embedding the measuring junction or sensing portion 85 of the temperature measuring device in the bearing housing in a manner so as to be responsive to the temperature within the housing. The method further includes providing a signal transmitter such as 94 proximate the housing for transmitting the signal received from the temperature measuring device to an instrument for determining the temperature sensed at the measuring junction or sensing portion.

In a preferred embodiment, the output from wires 91 is in millivolts and is converted by transmitter 94 to milliamps so that the measuring instrument and power source can be located some distance from the bearing.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An improved bearing assembly comprising:
   (a) a bearing housing defining a shaft bore containing therein at least one bearing, said bearing adapted to rotatably support a shaft extending into said shaft bore;
   (b) said housing further defining a receiving bore extending from a first location at an exterior surface of said housing towards said shaft bore to a second location radially inward of said first location, said receiving bore terminating prior to intersecting with said shaft bore to define a temperature measurement surface therein;
   (c) a thermocouple, said thermocouple including dissimilar wires connected at a measuring junction, said measure injunction of said thermocouple being embedded in said receiving bore and located adjacent said temperature measurement surface so as to be responsive to the temperature within said housing; and
   (d) a signal transmitter located proximate said housing for transmitting the signals received from the measuring junction to an instrument for determining the temperature sensed by the thermocouple at the measuring junction.

2. An improved bearing assembly as set forth in claim 1 above, wherein said receiving bore is unthreaded substantially along its entire length and further wherein said measuring junction of said thermocouple is embedded and secured against movement by an adhesive.

3. An improved bearing assembly as set forth in claim 2, wherein said receiving bore terminates approximately 1/16 inch prior to intersecting said shaft bore.

4. An improved bearing assembly as set forth in claim 2, wherein said adhesive substantially fills said receiving bore.

5. An improved bearing assembly as set forth in claim 1, wherein said measuring junction receiving bore is located offset from a plane passing through the center of said at least one bearing perpendicular to the axial direction of said shaft bore.

6. An improved bearing assembly as set forth in claim 1, wherein said transmitter is mounted directly to said bearing housing.

7. An improved bearing assembly comprising:
   (a) a bearing housing containing at least one bearing therein and including a shaft bore for receipt of said bearing, said housing further including an unthreaded measuring junction receiving bore extending from a first location at an exterior surface of said housing toward said shaft bore to a second location radially inward of said first location, said receiving bore terminating prior to intersecting with said shaft bore to define a temperature measurement surface therein;
   (b) a thermocouple, said thermocouple including a measuring junction, said measuring junction being secured in said housing in said measuring junction receiving bore by an adhesive and located adjacent said temperature measurement surface, said measuring junction arranged so as to be responsive to the temperature in said housing; and
   (c) a signal transmitter located proximate said housing for transmitting the signals received from the measuring junction to an instrument for determining the temperature sensed by the thermocouple at the measuring junction.

8. An improved bearing assembly as in claim 7, wherein said receiving bore terminates approximately 1/16 inch prior to intersecting said shaft bore.

9. An improved bearing assembly as in claim 7, wherein said measuring junction receiving bore is located offset from a plane passing through the center of said at least one bearing perpendicular to the axial direction of said shaft bore.

10. An improved bearing assembly as set forth in claim 7, wherein said transmitter is mounted directly to said bearing housing.

11. An improved method of sensing bearing temperature in a bearing assembly, said method including the steps of:
    (a) providing a bearing housing containing at least one bearing therein adapted to rotatably support a shaft in said housing, said housing defining a receiving bore extending from a first location adjacent an exterior surface of said bearing housing to a second location radially inward of said first location and defining a temperature measurement surface selectively spaced from an outer race of said bearing;
    (b) providing a thermocouple including dissimilar wires connected at a measuring junction;

(c) placing said measuring junction of said thermocouple in said receiving bore at a location adjacent said temperature measurement surface in a manner so as to be responsive to the temperature within said housing; and (d) providing a signal transmitter located proximate said housing for transmitting the signal received from the measuring junction to an instrument for determining the temperature sensed by the thermocouple at the measuring junction.

12. An improved method of sensing bearing temperature in a bearing assembly as in claim 11, further including the step of securing and embedding said measure injunction in said housing with an adhesive.

13. An improved method of sensing bearing temperature in a bearing assembly as in claim 11, and further including the step of mounting said transmitter directly to said housing.

14. An improved bearing assembly comprising:

(a) a bearing housing defining a shaft bore, said shaft bore containing at least one bearing therein adapted to rotatably support the shaft;

(b) said bearing housing further defining a receiving bore extending from a first location adjacent an exterior surface of said housing toward said shaft bore to a second location radially inward of said first location, said shaft bore terminating prior to intersecting with said shaft bore to define a temperature measurement surface at the second location, said temperature measurement surface spaced from said shaft bore by substantially 1/16 inch;

(c) a temperature measurement device, said temperature measurement device including a sensing portion placed in said temperature receiving bore at said temperature measurement surface, said sensing portion being embedded in said receiving bore and arranged so as to be responsive to the temperature within said housing.

15. An improved bearing assembly as set forth in claim 14, wherein said bearing assembly further includes a signal transmitter located proximate said housing for transmitting the signals received from the sensing portion to an instrument for determining the temperature sensed by the temperature measurement device.

16. An improved bearing assembly as set forth in claim 15, wherein said sensing portion is embedded in said receiving bore and secured against movement in said housing by an adhesive.

17. An improved bearing assembly as set forth in claim 16, wherein said adhesive substantially fills said receiving bore.

18. An improved bearing assembly as set forth in claim 14 above, wherein said receiving bore is unthreaded substantially along its entire length.

19. An improved bearing assembly as set forth in claim 18, wherein said sensing portion receiving bore is located offset from a plane passing through the center of said at least one bearing perpendicular to the axial direction of said shaft bore.

20. An improved bearing assembly as set forth in claim 14, wherein said temperature measurement device is a thermocouple.

21. An improved bearing assembly as set forth in claim 14, wherein said temperature measurement device is a resistance temperature detector.

* * * * *

UNITED STATES PATENT AND TRADEMARK OFFICE
CERTIFICATE OF CORRECTION

PATENT NO.  : 5,433,525
DATED       : July 18, 1995
INVENTOR(S) : El-Ibiary

It is certified that error appears in the above-indentified patent and that said Letters Patent is hereby corrected as shown below:

In Column 4, line 6, please delete the word "e,fra"

and delete the letter "e" after the number "1/16".

Signed and Sealed this

Fourteenth Day of November, 1995

Attest:

BRUCE LEHMAN

Attesting Officer         Commissioner of Patents and Trademarks